United States Patent Office 2,872,723
Patented Feb. 10, 1959

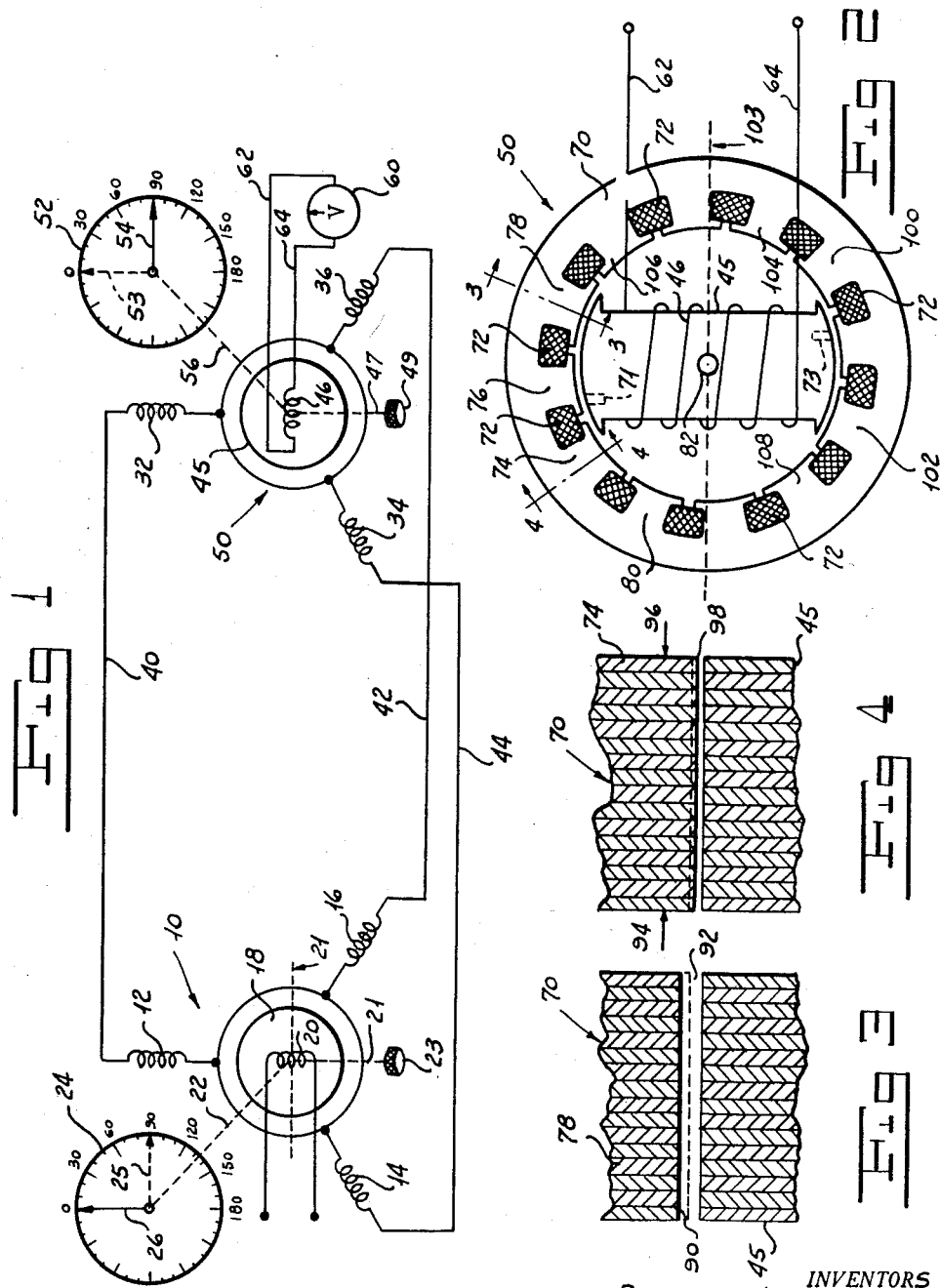

2,872,723

METHOD OF BALANCING SYNCHRO-TIE DEVICES

Bernard Levine, Malverne, Aaron M. Harris, Brooklyn, and Martin M. Brod, New York, N. Y., assignors, by mesne assignments, to United Aircraft Corporation, East Hartford, Conn., a corporation of Delaware Application May 23, 1955, Serial No. 510,082

10 Claims. (Cl. 29—155.5)

Our invention relates to a method of balancing synchro-tie devices and more particularly to a method of correcting inaccuracies owing to manufacturing and construction errors and inequalities in the permeability of magnetic material of which parts of the synchro-tie devices are formed.

Synchro-tie devices are well known to the art and are commonly referred to as "synchros." The term "synchro" is a universal one applied to any one of various synchronous devices, such as "Selsyn," "Autosyn," "Magslip" and the like. In general, a synchro can be theoretically treated as a salient pole, bipolar, alternating current excited synchronous machine. Most commonly the standard signal and control synchro of today has a two-pole, single-phase rotor field and a Y-wound, single-phase, variable voltage stator. The transmitter of the synchro-tie device is sometimes referred to as a "synchro-generator." The indicator synchro is sometimes referred to as "synchro-motor" or a "synchro-receiver."

A conventional synchro-tie system comprises two identical synchros with the windings of the respective synchro-generator and synchro-motor stators being connected in parallel. The rotors of the synchro-tie system are excited by an appropriate alterating potential of any desired frequency. The synchro-generator rotor induces voltages in the windings of its stator and the current flowing through the windings of the synchro-motor stator induces a resultant magnetic field, which field represents the position of the synchro-generator rotor. Owing to the fact that the synchro-motor rotor is energized, it will produce a magnetic field. This magnetic field will tend to align itself with the resultant magnetic field produced by the current flowing through the synchro-motor stator windings. For purposes of convenience, we will describe our invention with respect to the most commonly employed type of synchro-tie systems of today, that is, with a synchro having a three-phase stator winding and a single-phase rotor winding. It is to be understood, of course, that any appropriate polyphase winding may be employed in the stator and that our invention contemplates the balancing of any of the synchro-tie systems known to the art.

The demand for synchros is large and increasing rapidly owing to military requirements. They are used in many control systems and especially for use in guided missiles, fire control devices, bomb directors, torpedo directors and the like. The manufacture of accurate synchros is a time-consuming and difficult matter. Owing to normal tolerances in manufacture, it is often found that the angular position of the rotor of the synchro-motor will not always be coincident with the angular position of the rotor of the synchro-generator. This difference may vary depending on the excellence of manufacture. The cause of the error is extremely difficult to locate. It may be caused by eccentricity between the rotor and the stator. The spacing of the slots in which the stator windings are disposed may be nonuniform.

The distribution of the magnetic permeability of the laminations of which the stator is generally formed may be uneven. The alignment of the slots formed by the laminations with one another may be faulty. Then too, the windings themselves and their disposition in the slots may be inaccurate or nonuniform. The obtaining of a perfect synchro under present methods of manufacture is highly fortuitous. The more accurate synchros are now obtained by manufacturing a large number of them, testing them, and separating the more accurate ones from those of lesser accuracy. Inaccurate synchros represent a distinct economic waste. This method of obtaining accurate synchros adds greatly to their cost, and the shortage of accurate synchros is a matter of great concern to the armed services in which a large demand for accurate synchros exists for national defense purposes.

One object of our invention is to provide a method of balancing synchro-tie devices in a simple, economic and certain manner.

Another object of our invention is to provide a novel method of manufacturing synchros of extremely high accuracy with certainty in an inexpensive and convenient manner.

Another object of our invention is to provide a method of compensating for errors introduced into synchros during their manufacture and thus achieve fabrication of accurate synchros.

Other and further objects of our invention will appear from the following description.

In general, our invention contemplates determining the error of a synchro occasioned during its manufacture. This involves measuring not only the degree of unbalance of the resultant stator magnetic field but also the direction of unbalance. The actual magnetic field produced by the stator windings is then aligned with the true direction. This is done by increasing or decreasing the air gap between the rotor and the stator of the synchro being balanced, or by increasing or reducing the local permeability of the magnetic material of the stator in the region of the resultant magnetic field. Instead of trying merely to remove errors during manufacture, as is being practiced by the prior art, which experience has proven is costly, unfeasible and impractical, we accept the inevitable errors introduced during manufacture and compensate for them in order to produce, with greater certainty, extremely accurate synchros at reduced cost and in greater numbers for a given number of man hours of effort.

In the accompanying drawings which form part of the instant specification and which are to be read in conjunction therewith and in which like reference numerals are used to indicate like parts in the various views:

Figure 1 is a diagrammatic view of a synchro-tie system showing the position of the parts in carrying out the error measuring step of our process.

Figure 2 is a stylized elevation showing a synchro.

Figure 3 is a sectional view, drawn on an enlarged scale and taken along the line 3—3 of Figure 2, showing the step of our process of increasing the air gap between the stator and the rotor.

Figure 4 is a sectional view, similar to Figure 3, taken along the line 4—4 of Figure 2, showing the step of our process of decreasing the air gap between the stator and the rotor.

More particularly referring now to the drawings, a synchro-generator, indicated generally by the reference numeral 10, is provided with a Y-wound stator having windings 12, 14 and 16. The rotor 18 is provided with a single-phase winding 20. The synchro-generator 10 is manufactured with extreme care and carefully chosen to have as high accuracy as can be achieved. All other synchros may be tested and balanced against this master synchro-generator. The rotor 18 is connected by an appropriate shaft 22 to a calibrated dial 24 whose pointer 26 indicates the direction of the axis of the winding 20, that is, the direction of the magnetic field induced by the winding 20. If a voltage (1) $$e = E \sin \omega t$$

where E is the maximum value of the alternating potential, and $\omega$ is proportional to the frequency of the alternating potential is impressed on the rotor, three voltages will be induced in the stators of the synchro-generator. These voltages are impressed across the three synchro-motor field coils 32, 34 and 36 by a network comprising conductors 40, 42 and 44, as can readily be seen by reference to Figure 1. The voltages will cause currents to flow in the respective stator windings, thus producing three fluxes which can be represented by the expression (2) $$A \sin \omega t \cos [\theta(t) + n120°]$$

where A is a constant, and $\theta t$ is the angular displacement of the rotor 20 of the synchro-generator, and $n = 0, +1, -1$.

The three fluxes in the stator windings of the synchro-motor will produce a resultant field $\phi_r$ which can be expressed as (3) $$\phi_r = A \sin \omega t$$

This resultant field $\phi_r$ will induce a voltage $e'$ in the synchro-motor rotor winding 46 which may be expressed as (4) $$e' = \phi_r \cos \alpha$$

where $\alpha$ is the angular displacement between the direction of the resultant field produced by the stator windings and the synchro-motor rotor winding.

It will readily be appreciated that where $\alpha$ is ninety degrees the resultant voltage induced across the rotor winding will be zero.

The stator windings 32, 34 and 36 are part of the synchro to be balanced indicated generally by the reference numeral 50. A calibrated dial 52 is provided with a pointer 54 which is mechanically connected to the rotor 45 of the synchro-motor by a shaft 56. A shaft 21, provided with a knob 23, enables the rotor 18 of the synchro-generator to be displaced manually. A similar knob 49 is carried by a shaft 47 which is connected to the rotor 45 of the synchro-motor. The voltage induced by the resultant field across rotor winding 46 is measured by voltmeter 60 which is connected across the winding 46 by conductors 62 and 64.

For purposes of simplicity in describing the practice of our process, we will assume that the field produced by the rotor winding 20 of the synchro-generator is coaxial with the axis of the winding 20. The pointer 26 is positioned to rotate parallel to the axis of the winding 20. Any appropriate zero point may be chosen, as, for example, a zero point on the dial, so that the radius through this point on the dial will be parallel to the axis of the field generated by current flowing through the stator winding 12. The dial 52, with which the pointer 54 is associated, is oriented so that the radius through the zero point will be parallel to the axis of the field to stator winding 32 and parallel to a radius from the center of dial 24 through its zero point. The rotor 45 is connected to the pointer 54 so that the axis of the field of rotor winding 46 will move parallel to the pointer as the rotor is rotated. While the zero or reference positions shown in the drawings are positions parallel to the axes of transmitter and receiver phase windings, it is to be understood that these reference positions are arbitrary and that any other convenient reference positions may be selected.

Ordinarily, in a synchro-tie system the winding 46 of rotor 45 is excited by the same single-phase alternating potential which excites the winding 20 of the rotor 18 of the synchro-generator. In the practice of our method, we disconnect the synchro-motor rotor from the exciting voltage and then place a voltmeter 60 across the winding 46 of the motor rotor. We are now ready to begin our balancing operation. A plurality of general methods may be followed and we will describe them for purposes of completeness. In one method, we place the generator rotor so its pointer rests at 90°, that is, in the direction of the broken line pointer position 25. We then move the motor rotor 45 so its pointer rests at either 0°, that is, along the broken line pointer position 53, or at 180°. That is to say, if the generator rotor were placed at $\theta°$, the motor rotor would be placed at $\theta° \pm 90°$. We then measure the voltage by means of the voltmeter 60. If the voltage across the voltmeter 60 is zero, the synchro 50 is balanced at this position of the rotor with respect to the stator. If the synchro 50 is unbalanced at this position of the rotor, a voltage will be registered on the voltmeter and the amount and direction of unbalance is noted. At this point we may proceed in two ways. We may leave the motor rotor at 0° and rotate the generator rotor 18 in one direction or the other, depending on the direction of the error, through an amplitude, depending on the amount of the error, until the voltmeter shows a zero volt reading. Alternately, we may move the motor rotor in one direction or the other to bring the voltmeter to a zero reading. If we have to move the motor rotor in a counterclockwise direction to remove the error, that is, when the true direction is to the right of the indicated resultant field, we say that the deviation is "west." If we have to move the motor rotor in a clockwise direction to remove the error, that is, when the true direction is to the left of the indicated resultant magnetic field, we say the deviation is "east." Similarly, using our alternate method, if we rotate the generator rotor in a clockwise direction to remove the error, there is a "westerly" deviation and, if we move the generator rotor in a counterclockwise direction, there is an "easterly" deviation.

To remove an easterly deviation, we must rotate the resultant field of the synchro-motor in a counterclockwise direction. In Figure 2, we indicate the synchro-motor generally by the reference numeral 50. The stator of the synchro is formed with a plurality of laminations 70. The laminations are stacked to form elongated slots in which the stator windings 72 are positioned. The shape of the laminations are such that poles 74, 76, 78, 80 and the like are formed. Rotatably positioned within the stator upon shaft 82 is a rotor 45 which carries the rotor winding 46. It is this rotor winding which is connected across the voltmeter 60.

Let us assume that we have an easterly deviation, that is, the resultant magnetic field is too far to the right of where it ought to be. We must rotate the resultant magnetic field in a counterclockwise direction in order to compensate for the error. To do this we can increase the permeability of the laminations in the region of pole 74 and decrease the permeability of the laminations in the region of pole 78. The general rule is we must increase the permeability of the core material in advance of the direction of the desired rotation of the magnetic field. This can be done by inserting powdered, highly permeable, magnetic material in the slot adjacent pole 74.

A more practical method, however, is to vary the air gap between the stator and the rotor. To rotate the magnetic field in a counterclockwise direction with the rotor in the position shown in Figure 2, we decrease the air gap between the rotor and pole 74 and increase the air gap between the rotor and pole 78. The general rule is that the resultant field may be rotated by increasing the air gap in the wake of movement and decreasing the air gap in the advance of movement. An increase in the air gap increases the reluctance to the passage of magnetic flux in the magnetic circuit between the rotor and the stator.

Referring now to Figure 3, the operation of increasing the air gap between pole 78 and rotor 45 is shown. The surface 90 is honed by means of an abrasive from the broken line position to the full line position, thus increasing the air gap 92. The step of decreasing the air gap between rotor 45 and the pole 74 is shown in Figure 4. An anvil is placed at the point of arrow 94 and the laminations adjacent pole 74 are struck a sharp blow or repeated blows at point 96 and in the direction of the arrow. This upsets, deforms or draws the metal locally so that the surface 98 of the pole 74 moves from the broken line position to the full line position, thus decreasing the air gap between the pole 74 and the rotor 45.

The honing of the stator and the upsetting of the stator laminations is continued to remove one-half of the error. The rotor is then rotated 180° and the air gap between pole 100 and the rotor 45 is decreased and the air gap between pole 102 and the rotor 45 is increased to shift the resultant magnetic field further in a counterclockwise direction to reduce the error to zero, that is, to remove the other half of the error.

The synchro-generator rotor is then shifted 90° and the synchro being tested is rotated 90°. With the parts in this position, the windings will be as shown in Figure 1. The pointer 26 will be at zero and the pointer 54 will be at 90°. The rotor of Figure 2, however, will lie with its axis along the broken line 103. The same procedure is then followed. If the deviation at this point is westerly, the air gap between the rotor 45 and the pole 104 is decreased while the air gap between the rotor and the pole 106 is increased. The procedure is the same as before. Only one-half the error is removed and the rotor is rotated 180° and the diametrically opposite poles 80 and 108 are adjusted. For westerly error the air gap between pole 80 and the rotor will be decreased and the air gap between the rotor and pole 108 will be increased.

The rotor of the synchro-generator is then rotated to a 45° position and the procedure continues. After this the synchro-generator rotor is placed 22½° and the procedure followed to remove the error at this point. After this the synchro-generator rotor will be placed at a position of 157½° and the same procedure followed. In this manner all of the thirty-two points of the compass may be symmetrically adjusted. If desired, the adjustment may be to half points of the compass, or quarter points of the compass for cases of extreme accuracy. Some synchros are such that there will be a slight residual error which cannot be removed. Other synchros can be made to be almost perfect. All synchros, however, can be balanced greatly to improve their accuracy by means of our method.

Another method of procedure is to place the rotor of the synchro-generator at zero and the rotor of the synchro to be balanced at 90°. The balancing procedure outlined above is again followed, except that we attempt to remove all of the error at each position. We then step both rotors around in five degree increments continuing to remove all of the error. When the rotor of the synchro-motor reaches 180° and the rotor of the synchro being balanced, which occupies the position of the synchro-motor rotor, reaches 270°, the balancing operation is completed.

Another mode of proceeding is similar to that outlined in the just described method, except that only half the error is removed at each balancing point and the operation proceeds in the desired increments throughout 360°.

It will be understood that in practice there will be occasions when in increasing the air gap we may overhone a pole of the stator. In such cases we remove the overhoning by upsetting the metal of the stator to decrease the air gap to correct for this condition. Similarly, in some instances when we attempt to decrease the air gap we may overdraw the metal so that the resulting air gap is too small. In such cases we can hone some of the metal from the stator.

Advantageously, before we commence our operation, we may take a reading of the error completely around the synchro being balanced. If we find the error is displaced all in one direction, we may drill small holes in the rotor 45 and pack these holes with highly permeable material. For example, referring to Figure 2, to remove a constant easterly deviation we may drill a hole in the rotor 45 at the positions 71 and 73 and pack these holes with highly permeable magnetic material. To remove a constant westerly deviation, we may drill the holes and not pack with them with anything, thus decreasing the permeability between the stator and the rotor in the wake of the desired deflection of the magnetic field. It will be understood that if there is sufficient space we may deposit or secure highly permeable material on the rotor at the leading edge in the direction of desired deflection of the magnetic field, as will readily be understood by those skilled in the art. Any of these procedures remove the constant error which may be introduced by the winding of the rotor or by nonsymmetrical permeability distribution of the magnetic material in the laminations of the rotor. After the constant error has been removed, we begin our stepping and honing process outlined above.

It will be seen that we have accomplished the objects of our invention. We have provided a method of balancing synchro-tie devices in a simple, economic and certain manner. We are enabled to manufacture synchros having an extremely high accuracy with certainty. Our manufacturing method compensates for errors introduced into the synchros during their manufacture, following which compensation accurate synchros will be produced which may be used either as synchro-generators or synchro-motors. Our invention enables the saving of terrific economic waste now being experienced owing to the large demand for accurate synchros which exist for national defense purposes.

It will be understood that certain features and sub-combinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A method of balancing a pair of synchro-tie devices each of which has a polyphase stator winding and a single phase rotor winding including the steps of interconnecting the respective polyphase windings of a synchro-generator stator and a synchro-motor stator, energizing the generator rotor winding, displacing the motor rotor ninety degrees from the position of the generator rotor, measuring the voltage induced across the motor rotor winding, varying the relative displacement between the generator rotor and the motor rotor to reduce the induced motor-rotor voltage to zero, measuring the direction and amount of relative displacement from the ninety-degree displaced position to ascertain the relative deviation of the motor stator magnetic field and varying the reluctance of the magnetic circuit between the motor rotor and stator to shift the motor stator magnetic field to reduce the deviation.

2. A method as in claim 1 including successively positioning the generator rotor and the motor rotor at a plurality of predetermined angularly spaced positions at which said voltage measuring, displacement varying, displacement measuring and reluctance varying steps are performed.

3. A method as in claim 1 in which the motor stator magnetic field is shifted to remove half the deviation.

4. A method as in claim 1 in which the motor stator magnetic field is shifted to remove half the deviation, including the additional step of then displacing the motor rotor one hundred and eighty degrees and removing the balance of the deviation.

5. A method as in claim 1 in which said motor stator magnetic field is shifted by increasing the air gap between the motor rotor and its stator in the wake of the desired deflection.

6. A method as in claim 1 in which said motor stator magnetic field is shifted by decreasing the air gap between the motor rotor and its stator in advance of the desired deflection.

7. A method as in claim 1 in which said motor stator magnetic field is shifted by decreasing the reluctance of the magnetic circuit between the motor rotor and its stator in advance of the desired deflection.

8. A method as in claim 1 in which said motor stator magnetic field is shifted by increasing the reluctance of the magnetic circuit between the stator and the rotor in the wake of the desired deflection.

9. A method as in claim 1 in which said motor stator magnetic field is shifted by increasing the permeability of the magnetic circuit between the motor rotor and its stator in advance of the desired deflection.

10. A method as in claim 1 in which said motor stator magnetic field is shifted by decreasing the permeability of the magnetic circuit between the motor rotor and its stator in the wake of the desired deflection.

References Cited in the file of this patent

UNITED STATES PATENTS

| | | |
|---|---|---|
| 2,075,893 | Farrand | Apr. 6, 1937 |
| 2,432,003 | Giannini | Dec. 2, 1947 |
| 2,488,771 | Glass | Nov. 22, 1949 |
| 2,519,365 | Goertz | Aug. 22, 1950 |

OTHER REFERENCES

Kollsman Synchrotel Transmitters, published March 1950, pages 113–122, pages 116–117.